May 25, 1954
A. H. FREDRICK
2,679,556
CATHODE FOLLOWER SYSTEM
Filed Jan. 8, 1946
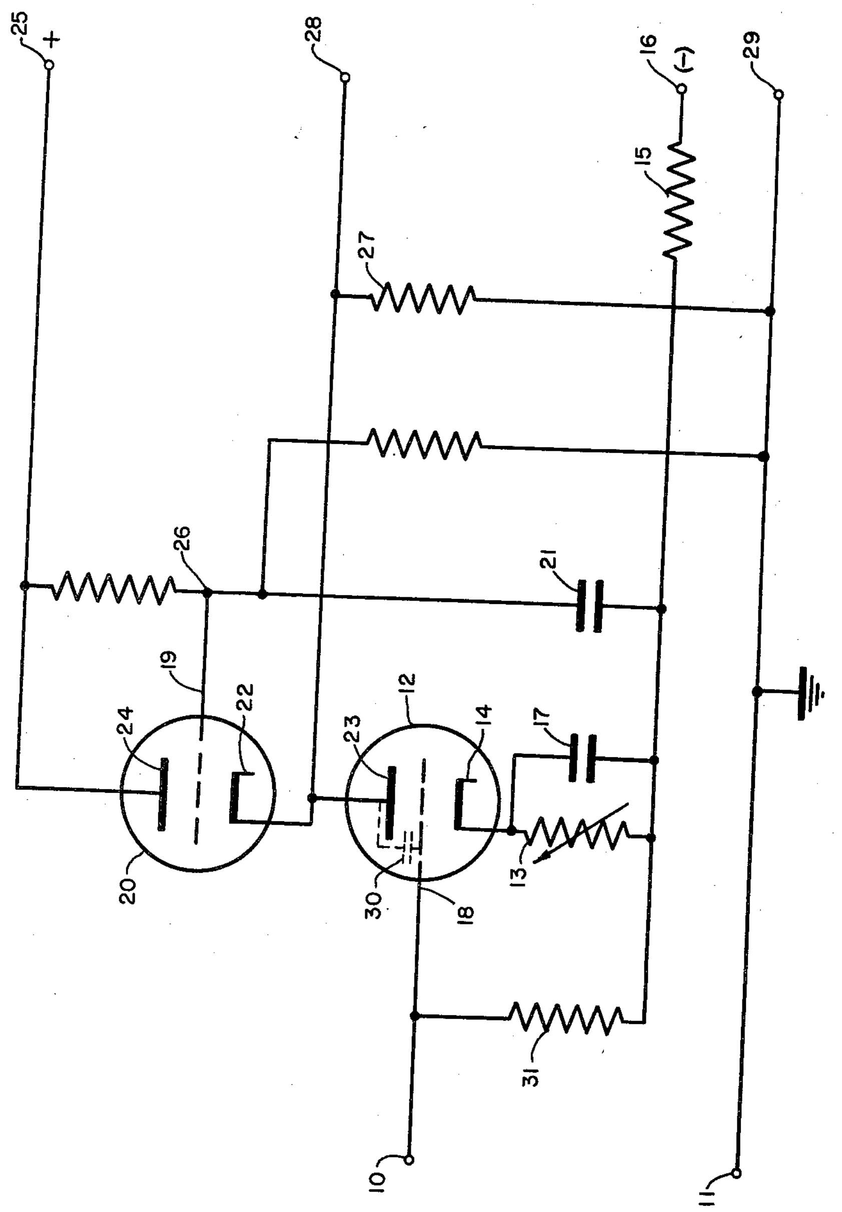
INVENTOR
ARDEN H. FREDRICK
BY M. A. Hayes
ATTORNEY Patented May 25, 1954

2,679,556

UNITED STATES PATENT OFFICE 2,679,556

CATHODE FOLLOWER SYSTEM

Arden H. Fredrick, Boston, Mass., assignor, by mesne assignments, to the United States of America as represented by the Secretary of the Navy Application January 8, 1946, Serial No. 639,891

11 Claims. (Cl. 179—171)

This invention relates to a cathode follower system, and more particularly, to a cathode follower system adapted to be placed between any point of an electrical circuit to be examined and the observing equipment to reduce the effect on the observed circuit that the addition of the observing equipment would ordinarily have.

In general, the problem of electrical circuit waveform observation resolves itself into the fundamental consideration of keeping the input impedance of the viewing apparatus sufficiently high so that the addition of this apparatus will in no way alter the performance of the observed circuit. Oscilloscopes themselves presented sufficiently high input impedances for observation of most electronic circuits, but as more modern techniques in circuitry tended toward higher frequencies, the input capacity of the oscilloscope became an increasingly more important factor in the determination of input impedance. The problem of input capacity is further accentuated by the recent tendency toward the use of non-sinusoidal waveforms. These waveforms are the composition of a number of sinusoidal waves whose frequencies and magnitudes are soluble by Fourier resolution. This resolution indicates that the accurate reproduction of the more irregular portions of non-sinusoidal waveforms is dependent upon the higher frequencies whose bearing on the problem of input capacity is apparent. This fact indicates that an observing means must present a high impedance to a broad band of frequencies. Methods which have been tried include capacity-resistance dividers, boot-strapped (constant voltage between two elements) pentodes, and ordinary cathode followers. All of these present a high input impedance but have certain disadvantages. The ordinary cathode follower becomes unwieldy at high frequencies due to the fact that for accurate reproduction for a given capacity load on the follower the value of the resistance load of the cathode follower must be decreased as frequency increases. This imposes an unreasonable power requirement on the cathode follower tube. Capacity-resistance dividers must have extremely broad band amplifiers whose purpose is to compensate for the amplitude loss in the divider; this does not lend itself to simple circuit structure. Since it is no more difficult to bootstrap a triode than it is to bootstrap the screen of a pentode, the advantage of fewer elements favors the triode.

To overcome these difficulties the present invention provides a circuit which meets the input impedance requirement and at the same time, yields a good high frequency response and hence accurate reproduction of irregular waveshapes without a complicated circuit structure.

Accordingly, it is an object of this invention to provide apparatus which will improve circuit observations.

It is a further object of this invention to provide apparatus which will reduce beyond presently obtainable values, the effective input capacity of the examining circuit and as a consequence will increase the input impedance placed in parallel with the circuit point being observed when said examining circuit is attached.

Another object of this invention is to provide an electrical circuit structure which will yield an accurate reproduction of irregular waveshapes which will be suitable for observation by oscilloscopes or other means without the use of a complicated circuit structure.

These and other and further objects will be more readily evident upon consideration of the following discussion, the understanding of which will be materially increased by reference to the accompanying circuit diagram which discloses an embodiment of this invention.

Input terminals 10 and 11 may be attached to any circuit, the observation of which seems desirable. The voltage existing at the circuit point under observation will be established across the grid to ground impedance of first cathode follower 12. Cathode follower 12 has variable bias resistor 13 connected between cathode electrode 14 and load resistor 15, whose lower end is connected to the negative side of a direct current voltage source applied at terminal 16. Since the waveforms to be observed by this equipment were approximately plus or minus 100 volts, this negative bias was provided to give the first cathode follower the ability to go down this far while still operating on the proper portion of its characteristic curves. Bias resistor 13 is by-passed by capacitor 17 for alternating currents. The grid return is made through resistor 31 which connects grid electrode 18 to the bottom of bias resistor 13. The voltage established across load resistor 15 as a result of the signal voltage developed at grid electrode 18 of first cathode follower 12 is impressed on grid electrode 19 of second cathode follower 20 through coupling condenser 21. Cathode electrode 22 of second cathode follower 20 is connected to anode electrode 23 of first cathode follower 12. Second cathode follower 20 has its anode electrode 24 connected to the positive side of a direct current voltage source connected at terminal 25. Grid electrode 19 of second cathode follower 20 is connected to a positive bias network at 26 to enable proper conduction of second cathode follower 20 and hence to provide an anode supply voltage for first cathode follower 12. Cathode electrode 22 of second cathode follower 20 is also connected to load resistor 27 across which are connected output terminals 28 and 29. For ease in use tube 12 of the present embodiment was mounted at the end of a cable together with grid resistor 31. The cable shield was boot-strapped back to the second cathode follower.

The above described circuit has a much lower input capacity than ordinary cathode followers whose capacity is commonly expressed as:

$$C_{in}=C_{gk}(1-A)+C_{gp}$$

where $C_{in}$ is defined as the input capacity, $C_{gk}$ is the grid-to-cathode inter-electrode capacitance of the tube, $C_{gp}$ is the grid-to-plate interelectrode capacitance, and A is the gain of the cathode follower stage. The factor $(1-A)$ arises from the fact that $C_{gk}$ is between the input and output terminals. The obvious limitation here is $C_{gp}$, which will remain of constant value no matter how close the gain of the cathode follower may be made to approach unity. If two cathode followers are cascoded (plate supplies connected in D. C. series) as shown in the accompanying drawing, the input capacitance becomes:

$$C_{in}=C_{gk}(1-A_1)+C_{gp}(1-A_1A_2)$$

where $A_1$ is the gain of first cathode follower 12, $A_2$ is the gain of second cathode follower 20, $C_{kg}$ is the grid-to-cathode capacitance of first cathode follower 12, and $C_{gp}$ is the grid-to-plate capacitance of first cathode follower 12, herein represented by dotted capacitor 30. $C_{gp}$ is now between input terminal 10 and output terminal 28 of second cathode follower 20. The potential across $C_{gp}$ becomes the difference between input and output voltages which may be expressed as the input voltage multiplied by the factor $(1-A_1A_2)$. Consequently, the factor $(1-A_1A_2)$ becomes the controlling one in the effective grid-to-plate capacity of first cathode follower 12. The effectiveness of such a circuit configuration is further increased if first cathode follower 12 is a small low power tube whose interelectrode capacities are accordingly small and if second cathode follower 20 is a large power tube of sufficient capability to drive an oscilloscope or other viewing apparatus. The second tube can be a power tube with relatively high values of interelectrode capacity as compared to the first tube because the second tube's interelectrode capacities have but slight effect upon the input capacity of the circuit as a whole. If these capacities are too high, the bandwidth will be adversely affected, since the input capacity of the second cathode follower does load the first cathode follower. In the present embodiment, an experimental result of an input capacity of one micromicrofarad was achieved. The input resistance can be made substantially infinite by proper choice of the grid resistance.

It is readily evident from the description of this embodiment, that a circuit has been provided which shows decided improvement in input impedance characteristics over existing cathode followers and which provides a good high frequency response in a simple circuit structure. Many modifications of the invention may be made without departing from the spirit thereof, and, therefore, no limitation should be imposed other than occurs in the appended claims.

What is claimed is:

1. An electronic circuit of cathode followers in cascode comprising, a first electron tube having at least a cathode, a grid, and a plate, a by-passed bias resistor having first and second terminals and connected at its first terminal to said cathode, a grid resistor connected between said second terminal of said bias resistor and said grid electrode, an input circuit connected between said grid and ground, a second vacuum tube having at least a cathode, a grid, and a plate, said cathode of said second vacuum tube being connected to said plate of said first vacuum tube, a resistor network providing a return path for said grid electrode of said second vacuum tube, a first load impedance having first and second terminals and connected at its first terminal to the second terminal of said bias resistor of said first vacuum tube, a second load impedance connected from the junction of said cathode of said second vacuum tube and said plate of said first vacuum tube to ground, a source of voltage, one side of said voltage source being connected to said plate of said second tube, the other side of said voltage source being connected to the second terminal of said first load impedance, means for impressing potential variations appearing on said first load impedance on said grid electrode of said second tube, and an output circuit connected across said second load impedance.

2. The circuit of claim 1 wherein said first vacuum tube is a low power tube with small interelectrode capacities and wherein said second vacuum tube is a high power tube.

3. The circuit of claim 1 wherein said first vacuum tube is biased to operate on the linear portion of its characteristic curve and wherein said bias resistor connected to said cathode of said first vacuum tube is made variable, so that its adjustment may control the static potential of said grid electrode of said first vacuum tube.

4. A high impedance electronic circuit comprising, a first electron tube having at least an anode, a cathode, and a grid, a biasing impedance having first and second terminals and connected to said cathode at its first terminal, an impedance connected between said second terminal of said biasing impedance and said grid, an input circuit connected between said grid and a point at a first reference potential level, a second electron tube having at least an anode, a cathode and a grid, said anode of said first tube being connected to said cathode of said second tube, said anode of said second tube being returned to a point at a second reference potential level, means connected between second terminal of said biasing impedance and said grid of said second tube adapted to couple a signal appearing at said second terminal to said grid of said second tube, means normally biasing said grid of said second tube at a potential intermediate said first and second reference potential levels, a first load impedance connected between said second terminal of said biasing impedance and a point at a third reference potential level and a second load impedance connected between the cathode of said second tube and a point at said first potential level, the input to said electronic circuit being applied between said grid of said first tube and a point at said first potential level, the output from said circuit appearing across said second load impedance.

5. Apparatus as in claim 4 wherein said first potential level is more positive than said third potential level and said second potential level is more positive than said first potential level.

6. A cathode follower system having a high input impedance comprising, a first cathode follower including a first electron tube having at least a grid, a cathode and an anode, said anode being returned to a first reference potential level, a cathode impedance coupled between said cathode and a second reference potential level which is negative with respect to said first reference level, and means normally biasing said grid to a potential intermediate said first and second reference potential levels, and a second cathode follower including, a second electron tube having at least a grid, a cathode and an anode, said anode of said second electron tube being returned to the cathode of said first electron tube, a second cathode impedance coupled at one end to the cathode of said second electron tube and at a second end to a third reference potential level which is negative with respect to said second reference potential level, means for coupling an input signal to said grid of said second electron tube, means for coupling a signal appearing across said second cathode impedance to the grid of said first electron tube and means for coupling an output signal from across said first cathode impedance.

7. Apparatus as in claim 6 wherein said means biasing said grid of said first electron tube is a voltage divider connected between said first and second reference potential levels.

8. A cathode follower system having a high input impedance comprising, a first cathode follower including a first electron tube having at least a grid, a cathode and an anode, said anode being returned to a first reference potential, a cathode impedance coupled between said cathode and a second reference potential level, said second reference potential level being negative with respect to said first reference potential level, and means normally biasing said grid at a potential intermediate said first and second reference potential levels, and a second cathode follower including a second electron tube having at least an anode, a grid, and a cathode, said anode of said second tube being returned to the cathode of said first tube, means in the grid-cathode circuit of said second tube biasing the grid of said second tube, a second cathode impedance coupled at one end to the cathode of said second tube and at a second end to a third reference potential level, said third reference potential being negative with respect to said second reference potential level, means for coupling an input signal to said grid of said second tube, means for coupling a signal appearing across said second cathode impedance to the grid of said first electron tube and means for abstracting an output signal from across said first cathode impedance.

9. Apparatus as in claim 8 wherein said biasing means for the grid of said second tube is interposed between the cathode of said second tube and said second cathode impedance.

10. Apparatus as in claim 8 wherein said biasing means for the grid of said second tube comprises a resistor connected in parallel to a capacitor, said parallel resistor-capacitor network being connected between the cathode of said second tube and said second cathode impedance.

11. Apparatus as in claim 8 wherein said biasing means for the grid of said second tube is adjustable and comprises, a variable resistor connected in parallel with a capacitor, said parallel resistor-capacitor network being connected between the cathode of said second tube and said second cathode impedance.

References Cited in the file of this patent

UNITED STATES PATENTS

| Number | Name | Date |
|---|---|---|
| 2,169,096 | Greenberg | Aug. 8, 1939 |
| 2,240,715 | Percival | May 6, 1941 |
| 2,329,073 | Mitchell et al. | Sept. 7, 1943 |
| 2,379,168 | McClellan | June 26, 1945 |